(12) United States Patent
Kunze et al.

(10) Patent No.: US 6,600,701 B1
(45) Date of Patent: Jul. 29, 2003

(54) STACKING UNIT FOR AN ELECTRONIC DEVICE WITH ELECTROMECHANICAL SWITCHING UNIT

(75) Inventors: Norbert Kunze, Diez (DE); Jörg Reber, Dresden (DE); Stefan Müller, Wetzler (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/674,671
(22) PCT Filed: Mar. 10, 2000
(86) PCT No.: PCT/EP00/02179
§ 371 (c)(1),
(2), (4) Date: Nov. 2, 2000
(87) PCT Pub. No.: WO00/54271
PCT Pub. Date: Sep. 14, 2000

(65) Prior Publication Data
(65)
(30) Foreign Application Priority Data

Mar. 11, 1999 (DE) .......................................... 199 10 661

(51) Int. Cl.⁷ .............................................. G11B 17/22
(52) U.S. Cl. .................................................... 369/30.28
(58) Field of Search .......................... 369/30.28, 30.27, 369/30.32, 30.33, 30.34, 30.81, 30.85, 30.87, 30.9, 30.97, 33.01, 30.76, 30.77, 30.78

(56) References Cited

U.S. PATENT DOCUMENTS

| 5,038,331 A | * | 8/1991 | Ogawa ..................... 369/30.85 |
| 5,276,668 A | * | 1/1994 | Kinoshita et al. ......... 369/30.85 |
| 6,229,770 B1 | * | 5/2001 | Yoshimura ............... 369/30.78 |

FOREIGN PATENT DOCUMENTS

| EP | 0892403 A1 | | 1/1999 |
| JP | 05242587 A | * | 9/1993 |
| JP | 8087811 A | | 8/1996 |

* cited by examiner

Primary Examiner—Hoa T. Nguyen
Assistant Examiner—Tianjie Chen
(74) Attorney, Agent, or Firm—Laurie E. Gathman

(57) ABSTRACT

The invention relates to a device for reading information stored on an information plate (6, 7) and/or writing information on an information plate (6, 7), comprising a stacking unit for the storage of at least two information plates in storage compartments (1, 2, 3, 4, 5). The invention is characterized in that the stacking unit comprises an electromechanical switching unit for detecting the information plates (6, 7) and in that the switching unit can be operated by the plate edges of the information plates (6, 7).

6 Claims, 3 Drawing Sheets

STACKING UNIT FOR AN ELECTRONIC DEVICE WITH ELECTROMECHANICAL SWITCHING UNIT

BACKGROUND OF THE INVENTION

The invention relates to a device for reading information stored on an information plate and/or writing information on an information plate, comprising a stacking unit for the storage of at least two information plates in storage compartments.

Such a device is known, for example, from the document JP 8087811A. Such devices are usually called changer devices. The term information plates is understood to refer to disc-shaped information carriers, for example CDs, CD-ROMs, and DVDs.

The information plates are stacked one above the other in individual pigeonholes. It is necessary for a reliable operation of the changer device that the control of the device should receive information as to which pigeonholes contain an information plate.

Optical sensors are provided in the known device inside the stacking unit for the detection of the information plates, which sensors form a photoelectric barrier.

Such optical sensors tend to become unreliable in the case of pollution. In addition, the sensor function is dependent on the optical reflection or transparency properties of the information plates.

SUMMARY OF THE INVENTION

It is an object of the invention to provide an alternative device of the kind mentioned in the opening paragraph which renders possible a reliable, failure-proof detection of the information plates inside the stacking unit.

According to the invention, this object is achieved in that the stacking unit comprises an electromechanical switching unit for detection of the information plates, and in that the switching unit can be operated by the plate edges of the information plates.

Such an electromechanical switching unit operates very reliably, shows no tendency to fail in the case of pollution, and its function is independent of the optical reflection and transparency properties of the information plates.

When an information plate is being transported inside the stacking unit, the electromechanical switching unit is operated by the edge of the respective passing information plate, whereby an electrical signal can be obtained from which the occupation of the individual storage compartments in the stacking unit can be concluded.

The inlet slopes in the embodiment of the invention as claimed in claim 2 render it possible to actuate the switching unit with a very small force.

The dimensioning of the slopes in accordance with claim 3 renders possible a very compact construction of the stacking unit.

The advantageous embodiment of the invention as defined in claim 4 renders it possible to utilize standard components, for example standard contact switches, for the switching unit. This is particularly favorable as regards cost price.

In the advantageous embodiment of the invention in accordance with claim 5, the switching unit may at the same time also be utilized for ascertaining whether the information plate has fully entered the storage compartment during the process of filling the storage compartment, which is in the transitional position. Once it has fully entered the storage compartment, the information plate presses against the switching unit, from which a stop signal can be derived for switching off the transport mechanism. The switch accordingly not only has the function of detecting the occupation of the storage compartment but also a further detection function. This dual function of the switching unit implies that an additional switch can be dispensed with.

BRIEF DESCRIPTION OF THE DRAWINGS

A few diagrammatically depicted embodiments of the invention will now be explained in more detail with reference to the drawing comprising FIGS. 1 to 4, of which.

DETAILED DESCRIPTION OF THE PREFERRED EMBODIMENTS

Figure 1:
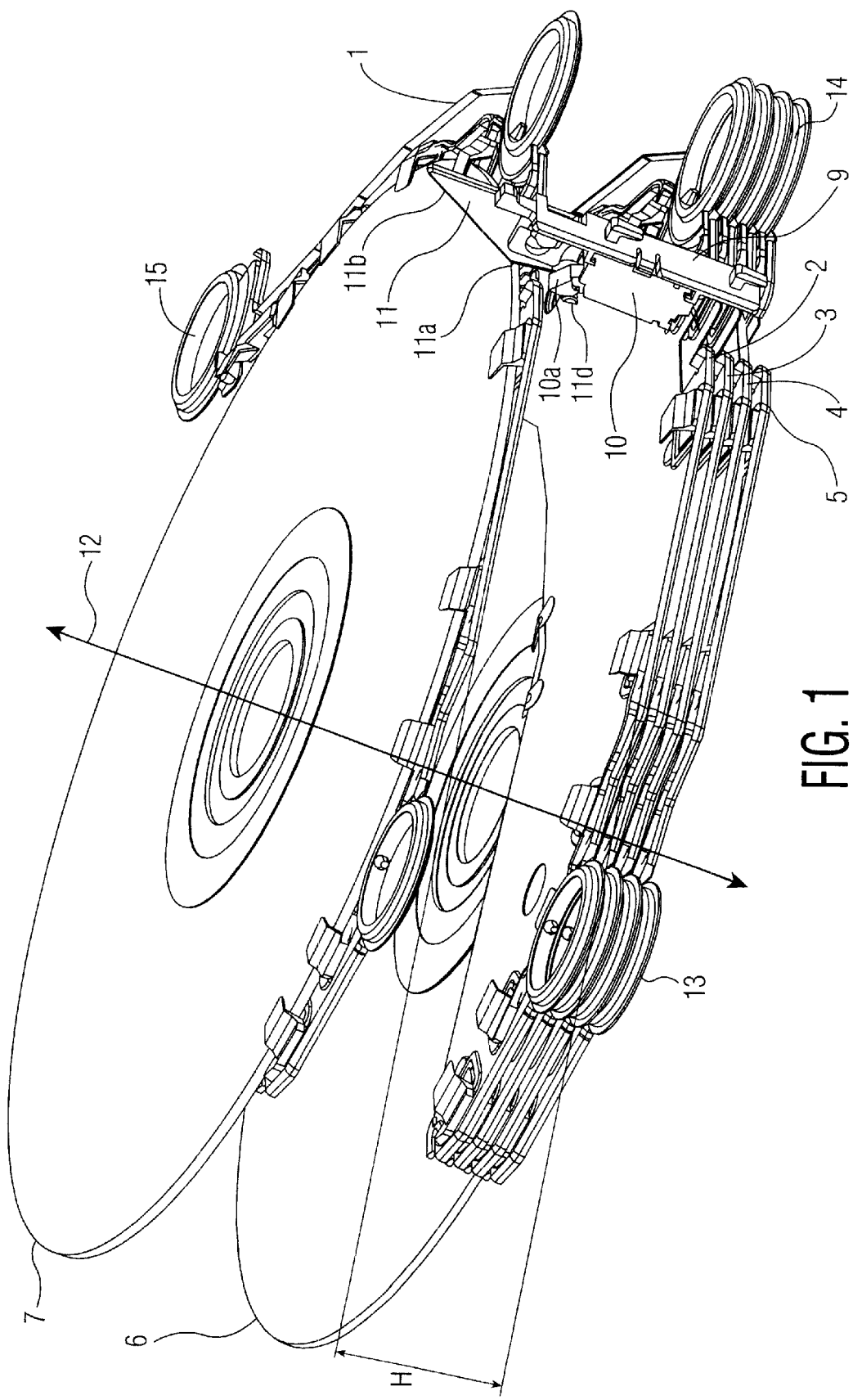
FIG. 1 is a perspective view of a stacking unit of a device for reading information stored on an information plate and/or writing information on an information plate, where four individual compartments are in lower stacking positions and one individual compartment in a transitional position.

FIG. 1 shows a stacking unit of a device for reading information stored on an information plate and/or writing information on an information plate. The stacking unit comprises a number of individual pigeonholes 1 to 5 shaped as flat storage compartments. An information plate 7 is present in the upper compartment 1, and an information plate 6 is present in the lower compartment 5. The compartments 2 to 5 are all in their respective lowermost positions, i.e. moved as far down as possible. The displacement of the compartments 1 to 5 in a stacking direction 12 may take place, for example, through rotation of worm gears whose outer threads are in engagement with recesses 13, 14, and 15 of the respective compartments. The compartment 1 is in a transitional position from which a transport of the information plate 7 is possible by means of a transport mechanism which is not shown in any detail, i.e. into a playback position for playing the information plate or into an ejection position for removing the information plate from the device. The various compartments are transported in the stacking direction 12 into the transitional position for the purpose of loading and unloading. Preferably, the slope of the worm gears (not shown) in the region of the transitional position is greater than in the region of the stacking positions, with the result that the distance H between the individual compartments changes during the process of displacement inside the stacking unit. A detailed description of the operation of such a stacking unit is described in the document EP 0892403, which is to be included through express reference into the disclosure of the present application.

The distance H is at its greatest in the transitional position, in which the compartment 1 is present. This creates room for the transport mechanism, which is not shown in any detail, for transporting the information plate 7 from the transitional position into an ejection or playback position. By contrast, the distance between the individual compartments is very small in the lower stack positions in which in FIG. 1 the compartments 2 to 5 are present. A switching unit with an electrical switch 10, an operating lever 11, and an abutment element 9 are arranged in the peripheral region of the information plate 7. The operating lever 11 is rotatably journaled and comprises inlet slopes 11b and 11c as well as an extension 11d. The extension 11d lies against a switching lever 10a of the electrical switch 10.

When an information plate is moved up or down inside the stacking unit in the stacking direction 12, its outer edges slide along the inlet slopes 11b/11c of the operating lever 11, whereby the operating lever 11 is pivoted in the direction of the switch 10. The extension 11d thus presses against the switching lever 10a of the switch 10, whereby the switch 10 is operated. The switching point of the switch 10 is chosen such that it is switched the moment the relevant information plate lies approximately at the level of point 11a of the operating lever 11. This is true for the information plate 7 in FIG. 1.

The switch 10 supplies a switching signal to a control unit of the device which is not shown in any detail. In combination with an unequivocal assignment signal for that individual compartment which is instantaneously in the transitional position, which signal is not described in any detail here, it can thus be unequivocally detected through a simple displacement of the individual compartments inside the stacking unit which individual compartments are provided with an information plate. This is stored in an electric memory.

To fill an individual compartment with an information plate, the relevant compartment is to be transported into the transitional position, in which in FIG. 1 the compartment 1 is present. The information plate to be inserted can now be transported by means of the transport mechanism, which is not shown, from an ejection or playback position into the compartment present in the transitional position. During this, the edge of the information plate operates the lever 11 in point 11a and thus switches the switch 10, from which a stop signal for controlling the transport mechanism can be derived. The switch 10 thus has a dual function.

Figure 2:
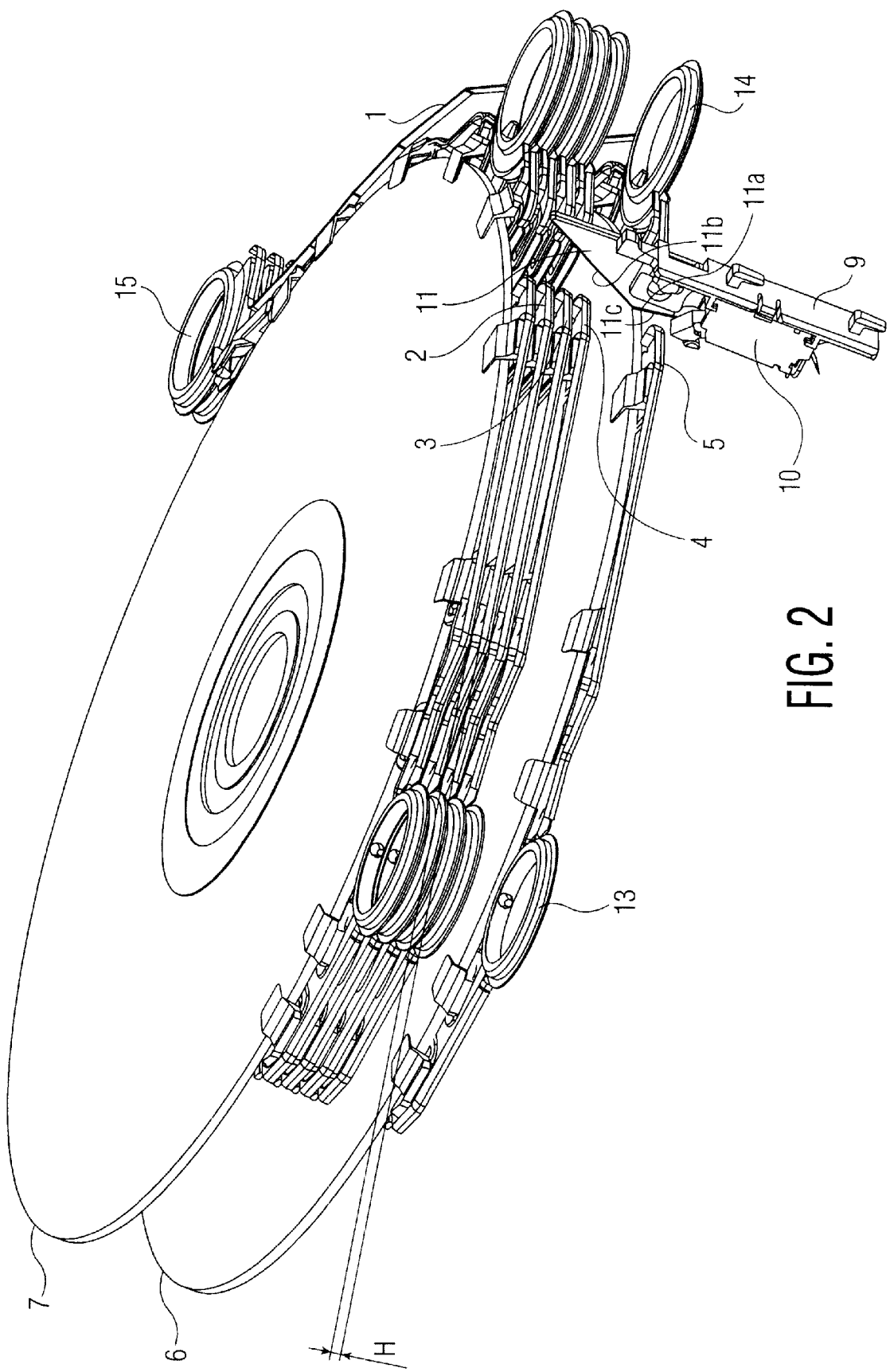
FIG. 2 shows the stacking unit of FIG. 1, with four individual compartments in upper stacking positions and one individual compartment in a transitional position.

FIG. 2 shows the stacking unit of FIG. 1 with the compartments 1 to 4 being moved into the upper stack positions and the compartment 5 with the information plate 6 being in the transitional position. In the situation shown in FIG. 2, the switch 10 is just being switched by the information plate 6. The individual compartments 2, 3, and 4 have indeed passed the point 11a of the contact lever on their way upwards from the lower stack positions into the upper stack positions, but the switch 10 was not operated thereby because the compartments 2, 3, and 4 are not filled with information plates.

Figure 3:
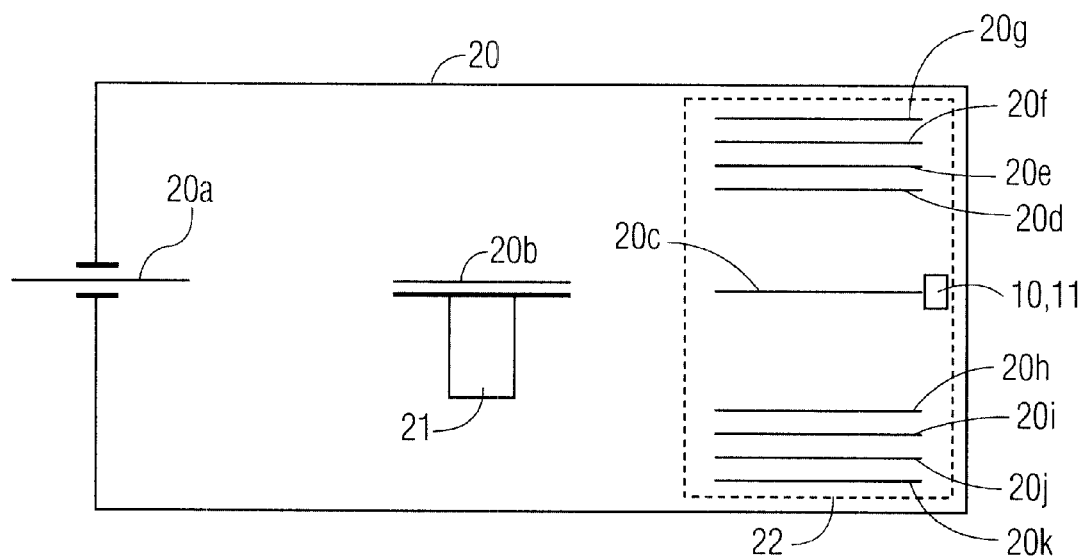
FIG. 3 is a diagrammatic lateral elevation of the device.

FIG. 3 is a diagrammatic side elevation of a device 20 for reading information stored on an information plate and/or writing information on an information plate. To clarify the manner of operation, an information plate 20 is shown in various positions 20a to 20k inside the device. The position 20a represents an ejection position in which the information plate can be taken from the device 20. The information plate can be transported from the ejection position 20a into a playback position 20b on a turntable 21 by a transport mechanism, which is not shown in any detail, or into a transitional position 20c inside the stacking unit 22. The fact that a plate has reached the transitional position is detected by means of the switch 10 and the operating lever 11 in that the plate edge of the information plate 20c presses against the tip 11a of the operating lever. This switches off the transport mechanism which is in charge of the transport between the ejection/playback position and the transitional position. Starting from this transitional position, the information plate can now be transported into upper stack positions 20d to 20g or lower stack positions 20h to 20k by means of a further transport mechanism, in particular the worm gear mechanism described with reference to FIG. 1.

Figure 4:
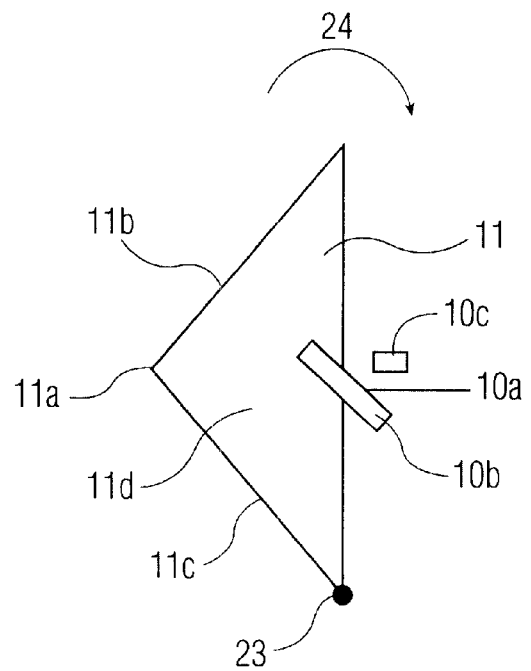
FIG. 4 is a diagrammatic cross-sectional view of a switching unit for detecting the information plates inside the stacking unit.

FIG. 4 is a diagrammatic cross-sectional view of the switch 10 and the operating lever 11 of FIGS. 1 to 3. The operating lever 11 is rotatably journaled about a pivot axis 23. When an information plate moving down inside the stacking unit presses from above against the inlet slope 11b, or moving up presses from below against the inlet slope 11c, the operating lever 11 will pivot in the direction of the arrow 24. The extension 11d then presses against the switching lever 10a of the switch 10, whereby a switch contact is established with the contact surface 10c and a control signal is supplied to a control unit which is not shown in any detail.

What is claimed is:

1. A device for reading information stored on an information plate and/or writing of information on the information plate, comprising a stacking unit for storage of a plurality of information plates in a plurality of storage compartments, wherein the stacking unit comprises an electromechanical switching unit for detection of the information plates, and wherein the switching unit operates by contacting a plate edge of one of said plurality of information plates when said one of said plurality of information plates moves up or down in a stacking direction within said stacking unit.

2. A device as claimed in claim 1, wherein the switching unit comprises an operating lever that comprises a first inlet slope that is capable of contacting a plate edge of one of said plurality of information plates and a second inlet slope that is capable of contacting a plate edge of one of said plurality of information plates.

3. A device as claimed in claim 2, wherein the operating lever has an extension which is designed for actuating a switch.

4. A device as claimed in claim 1, wherein the switching unit is designed to supply a control signal for controlling a transport mechanism and/or for storing the occupation data of the storage compartments of the stacking unit in an electronic storage medium.

5. A device for reading information stored on an information plate and/or writing of information on the information plate, comprising a stacking unit for storage of at least two information plates in storage compartments, wherein the stacking unit comprises an electromechanical switching unit for detection of the information plates, and wherein the switching unit can be operated by the plate edges of the information plates, and wherein the switching unit comprises an operating lever with a first and a second inlet slope, wherein the respective inclinations of the inlet slopes of the operating lever on the one hand are made sufficiently great, so that the operating lever does not make contact with information plates stored in storage positions, and said inclinations on the other hand are made sufficiently small, so that the friction force necessary for operating the lever is as small as possible.

6. A device for reading information stored on an information plate and/or writing of information on the information plate, comprising a stacking unit for storage of at least two information plates in storage compartments, wherein the stacking unit comprises an electromechanical switching unit for detection of the information plates, and wherein the switching unit can be operated by the plate edges of the information plates, and wherein the switching unit is arranged in a transitional position of the stacking unit, from which position an information plate can be transported on the one hand into an ejection or playback position, and on the other hand into stacking positions of the stacking unit.

* * * * *